United States Patent
Zhu et al.

(10) Patent No.: US 8,909,437 B2
(45) Date of Patent: Dec. 9, 2014

(54) PAYLOAD ESTIMATION SYSTEM

(71) Applicant: Caterpillar Inc., Peoria, IL (US)

(72) Inventors: Yongliang Zhu, Dunlap, IL (US);
Joseph Faivre, Edelstein, IL (US); Drew A. Fehr, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 111 days.

(21) Appl. No.: 13/654,028

(22) Filed: Oct. 17, 2012

(65) Prior Publication Data

US 2014/0107897 A1   Apr. 17, 2014

(51) Int. Cl.
*G06F 19/00* (2011.01)
*E02F 9/00* (2006.01)
*B60W 10/00* (2006.01)
*B60W 10/08* (2006.01)
*B60W 30/18* (2012.01)
*E02F 9/20* (2006.01)
*E02F 9/26* (2006.01)

(52) U.S. Cl.
CPC ............... *E02F 9/00* (2013.01); *E02F 9/2025* (2013.01)
USPC ................... 701/50; 701/53; 701/54; 701/84; 701/87; 701/90; 701/124

(58) Field of Classification Search
CPC ..... E02F 9/2025; E02F 9/2029; E02F 9/2037; E02F 9/2045; E02F 9/26; E02F 9/262; E02F 9/264; E02F 9/265
USPC ..................... 701/50, 53–54, 84, 87, 90, 124; 172/75–76
See application file for complete search history.

(56) References Cited

U.S. PATENT DOCUMENTS

| | | | | |
|---|---|---|---|---|
| 6,081,761 A | * | 6/2000 | Harada et al. | 701/72 |
| 6,225,574 B1 | * | 5/2001 | Chang et al. | 177/139 |
| 6,240,353 B1 | * | 5/2001 | Ishikawa et al. | 701/50 |
| 6,518,519 B1 | | 2/2003 | Crane, III et al. | |
| 7,597,162 B2 | * | 10/2009 | Won | 180/9.32 |
| 7,912,612 B2 | | 3/2011 | Janardhan et al. | |
| 7,975,410 B2 | * | 7/2011 | Faivre et al. | 37/348 |
| 8,065,061 B2 | * | 11/2011 | O'Neal | 701/50 |
| 8,244,438 B2 | * | 8/2012 | Koch et al. | 701/50 |
| 8,271,229 B2 | * | 9/2012 | Hsu et al. | 702/174 |
| 8,473,165 B2 | * | 6/2013 | Shono et al. | 701/50 |
| 8,560,181 B2 | * | 10/2013 | Ekvall et al. | 701/50 |
| 8,768,580 B2 | * | 7/2014 | Mizuochi et al. | 701/50 |
| 2004/0158381 A1 | * | 8/2004 | Strelioff et al. | 701/50 |

(Continued)

FOREIGN PATENT DOCUMENTS

JP   07-259141 A   10/1995
JP   10-245874 A    9/1998

(Continued)

*Primary Examiner* — Mary Cheung
*Assistant Examiner* — Atul Trivedi
(74) *Attorney, Agent, or Firm* — Leydig, Voit & Mayer, Ltd.

(57) ABSTRACT

A payload control system includes a sensor system and a force sensor system. A controller determines a calibration machine state, a calibration linkage force, and machine calibration parameters based at least in part upon the calibration machine state and the calibration linkage force. The controller also determines a loaded implement machine state, a loaded implement linkage force, and a mass of the payload based at least in part upon the machine calibration parameters, the loaded implement machine state, and the loaded implement linkage force.

22 Claims, 5 Drawing Sheets

(56) References Cited

U.S. PATENT DOCUMENTS

| | | | |
|---|---|---|---|
| 2005/0177292 A1* | 8/2005 | Okamura et al. | 701/50 |
| 2008/0319710 A1* | 12/2008 | Hsu et al. | 702/174 |
| 2009/0139119 A1* | 6/2009 | Janardhan et al. | 37/413 |
| 2009/0139790 A1* | 6/2009 | O'Neal | 180/290 |
| 2009/0143896 A1* | 6/2009 | Janardhan et al. | 700/213 |
| 2009/0319133 A1* | 12/2009 | Ekvall et al. | 701/50 |
| 2010/0063682 A1* | 3/2010 | Akaki | 701/42 |
| 2010/0222970 A1* | 9/2010 | Shono et al. | 701/50 |
| 2011/0071739 A1* | 3/2011 | Sano et al. | 701/50 |
| 2012/0003070 A1* | 1/2012 | Tochizawa et al. | 414/685 |
| 2012/0004816 A1* | 1/2012 | Okamura et al. | 701/50 |
| 2012/0130599 A1* | 5/2012 | Faivre et al. | 701/50 |
| 2012/0158279 A1* | 6/2012 | Faivre et al. | 701/124 |
| 2012/0232763 A1* | 9/2012 | Mizuochi et al. | 701/50 |

FOREIGN PATENT DOCUMENTS

| | | |
|---|---|---|
| JP | 2006-200251 A | 8/2006 |
| JP | 4172325 B2 | 10/2008 |
| WO | WO 2006/098645 A1 | 3/2006 |

* cited by examiner

PAYLOAD ESTIMATION SYSTEM

TECHNICAL FIELD

This disclosure relates generally to a payload control system and, more particularly, to a payload estimation system utilizing a simplified calibration process.

BACKGROUND

Many different types of machines utilize work implements or tools to transfer material from a work site to another location, such as haul or transport vehicles. Examples of these machines include excavators, backhoes, loaders, and various other machines for moving dirt, gravel, stone, or other material. When loading a haul or transport vehicle, it may be desirable to monitor and record the amount of the material loaded onto the vehicle. Monitoring the payload may reduce the likelihood of overloading the vehicle.

One way to determine the total weight of the material loaded onto a haul vehicle is to automatically calculate or estimate the total payload delivered to the haul vehicle by the work tool of a machine such as an excavator or other material moving machine. One difficulty with some payload estimation processes is that they require an operator to move the implement or linkage of the material moving machine in a particular manner. In some situations, this may require an operator to focus on the manner in which the implement or linkage is being moved rather than the task of moving material from one location to another.

U.S. Pat. No. 7,912,612 discloses a payload calculation system for use with a work implement. The disclosed payload calculation system measures a state of a work implement and uses a processing device to calculate a mass of a payload moved by the work implement.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for determining a mass of a payload moved by a work implement includes a linkage member movable along a path and operatively connected to move the work implement. A sensor system is configured to provide a plurality of machine state signals indicative of a state of the machine, and a force sensor system is configured to provide a linkage force signal indicative of a force on the linkage member. A controller is configured to receive a first set of calibration machine state signals as the work implement is moved in an unloaded condition, to determine a calibration machine state based upon the first set of machine state signals, to determine a calibration linkage force on the linkage member based at least in part upon a calibration linkage force signal generated as the work implement is moved in the unloaded condition, and to determine machine calibration parameters based at least in part upon the calibration machine state and the calibration linkage force. The controller is further configured to receive a second of loaded implement machine state signals as the work implement is moved in a loaded condition, to determine a loaded implement machine state based upon the second set of machine state signals, to determine a loaded implement linkage force on the linkage member based at least in part upon a loaded implement linkage force signal generated as the work implement is moved in a loaded condition, and to determine a mass of the payload based at least in part upon the machine calibration parameters, the loaded implement machine state, and the loaded implement linkage force.

In another aspect, a controller implemented method of determining a mass of a payload moved by a work implement includes receiving a first set of calibration machine state signals as a work implement is moved in an unloaded condition, determining a calibration machine state based upon the first set of machine state signals, determining a calibration linkage force on a linkage member based at least in part upon a calibration linkage force signal generated as the work implement is moved in the unloaded condition, and determining machine calibration parameters based at least in part upon the calibration machine state and the calibration linkage force. The method further includes receiving a second set of loaded implement machine state signals as the work implement is moved in a loaded condition, determining a loaded implement machine state based upon the second set of machine state signals, determining a loaded implement linkage force on the linkage member based at least in part upon a loaded implement linkage force signal generated as the work implement is moved in a loaded condition, and determining a mass of the payload based at least in part upon the machine calibration parameters, the loaded implement machine state, and the loaded implement linkage force.

In yet another aspect, a machine includes a work implement, a linkage member movable along a path and operatively connected to move the work implement. A sensor system is configured to provide a plurality of machine state signals indicative of a state of the machine and a force sensor system is configured to provide a linkage force signal indicative of a force on the linkage member. A controller is configured to receive a first set of calibration machine state signals as the work implement is moved in an unloaded condition, to determine a calibration machine state based upon the first set of machine state signals, to determine a calibration linkage force on the linkage member based at least in part upon a calibration linkage force signal generated as the work implement is moved in the unloaded condition, and to determine machine calibration parameters based at least in part upon the calibration machine state and the calibration linkage force. The controller is further configured to receive a second of loaded implement machine state signals as the work implement is moved in a loaded condition, to determine a loaded implement machine state based upon the second set of machine state signals, to determine a loaded implement linkage force on the linkage member based at least in part upon a loaded implement linkage force signal generated as the work implement is moved in a loaded condition, and to determine a mass of the payload based at least in part upon the machine calibration parameters, the loaded implement machine state, and the loaded implement linkage force.

DETAILED DESCRIPTION

Figure 1:
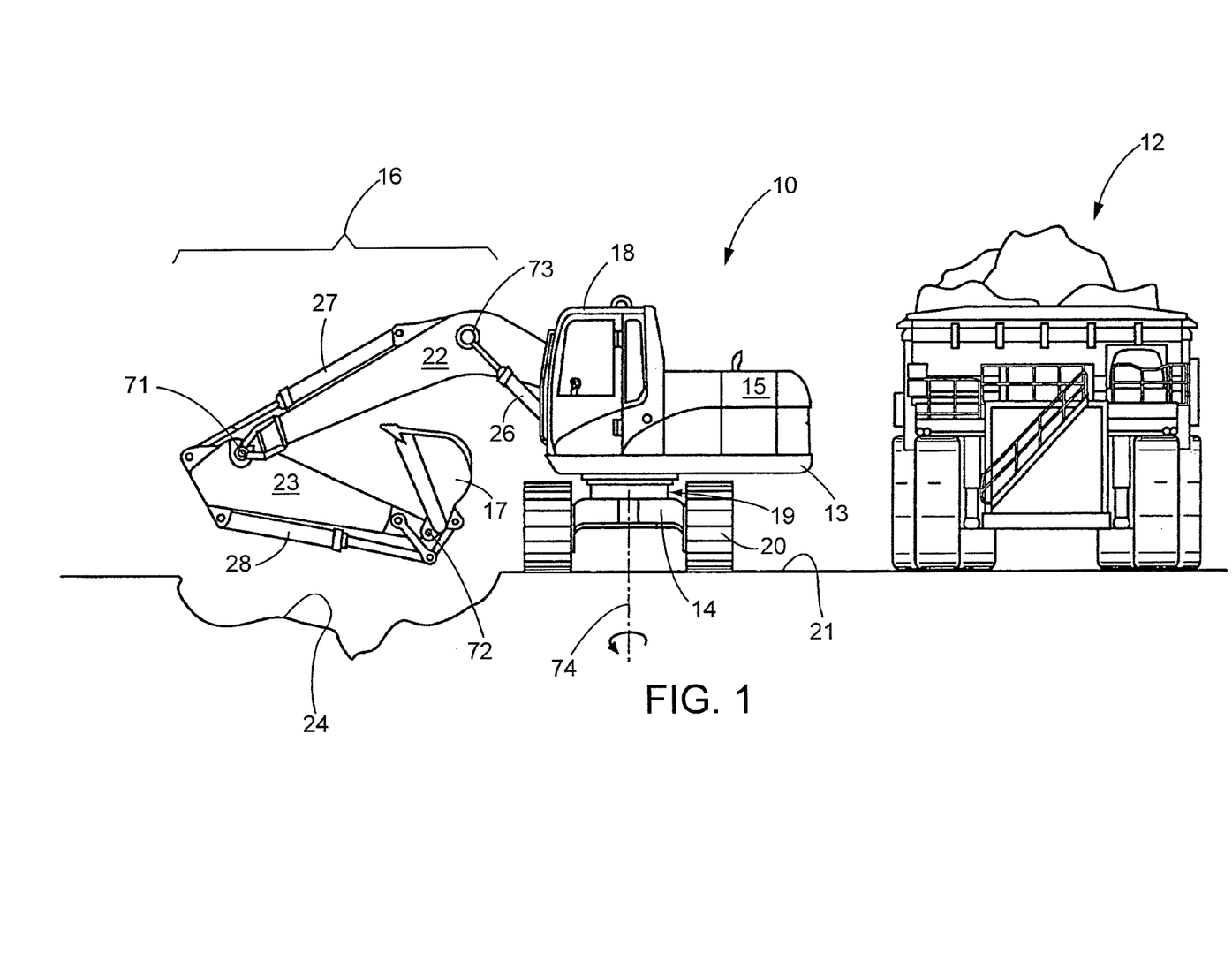
FIG. 1 is a side view of an excavator including a payload cycle detection system in accordance with the disclosure and with an adjacent target vehicle.

FIG. 1 illustrates an exemplary machine 10 such as an excavator having multiple systems and components that cooperate to perform an operation such as excavating earthen material from a dig site 24 and loading it onto a nearby target such as haul vehicle 12. Machine 10 may include a swing member or platform 13, an undercarriage 14, a prime mover 15, and an implement system 16 including a work implement or tool such as bucket 17. Other types of work implements may also be used.

Platform 13 may be rotatably disposed on undercarriage 14 and includes an operator station 18 from which an operator may control the operation of machine 10. Rotation of platform 13 relative to undercarriage 14 may be effected by a swing motor 19.

Undercarriage 14 may be a structural support for one or more traction devices 20. Traction devices 20 may include one or more tracks configured to allow translational motion of machine 10 across a work surface 21. Alternatively, traction devices 20 may include wheels, belts, or other traction devices known in the art.

A prime mover 15 may provide power for the operation of machine 10. Prime mover 15 may embody a combustion engine, such as a diesel engine, a gasoline engine, a gaseous fuel powered engine (e.g., a natural gas engine), or any other type of combustion engine known in the art. Prime mover 15 may alternatively embody a non-combustion source of power, such as a fuel cell or a power storage device such as a battery coupled to a motor. Prime mover 15 may provide a rotational output to drive traction devices 20, thereby propelling machine 10. Prime mover 15 may also provide power to other systems and components of machine 10.

Implement system 16 may include one or more linkage members configured to move a load. In one example, the implement system may include a boom member 22 and a stick member 23, and a work implement or tool. A first end of boom member 22 may be pivotally connected to platform 13, and a second end of boom member 22 may be pivotally connected to a first end of stick member 23. The work implement or tool such as bucket 17 may be pivotally connected to a second end of stick member 23.

Each linkage member may include and be operatively connected to one or more actuators such as hydraulic cylinders. More specifically, boom member 22 may be propelled or moved along a path by one or more boom hydraulic cylinders 26 (only one being shown in FIG. 1). Stick member 23 may be propelled by a stick hydraulic cylinder 27. Rotation of the bucket 17 relative to the stick member 23 may be effected by a work implement hydraulic cylinder 28. The linkage members may translate or rotate in a plane that is generally orthogonal to the work surface 21.

Figure 3:
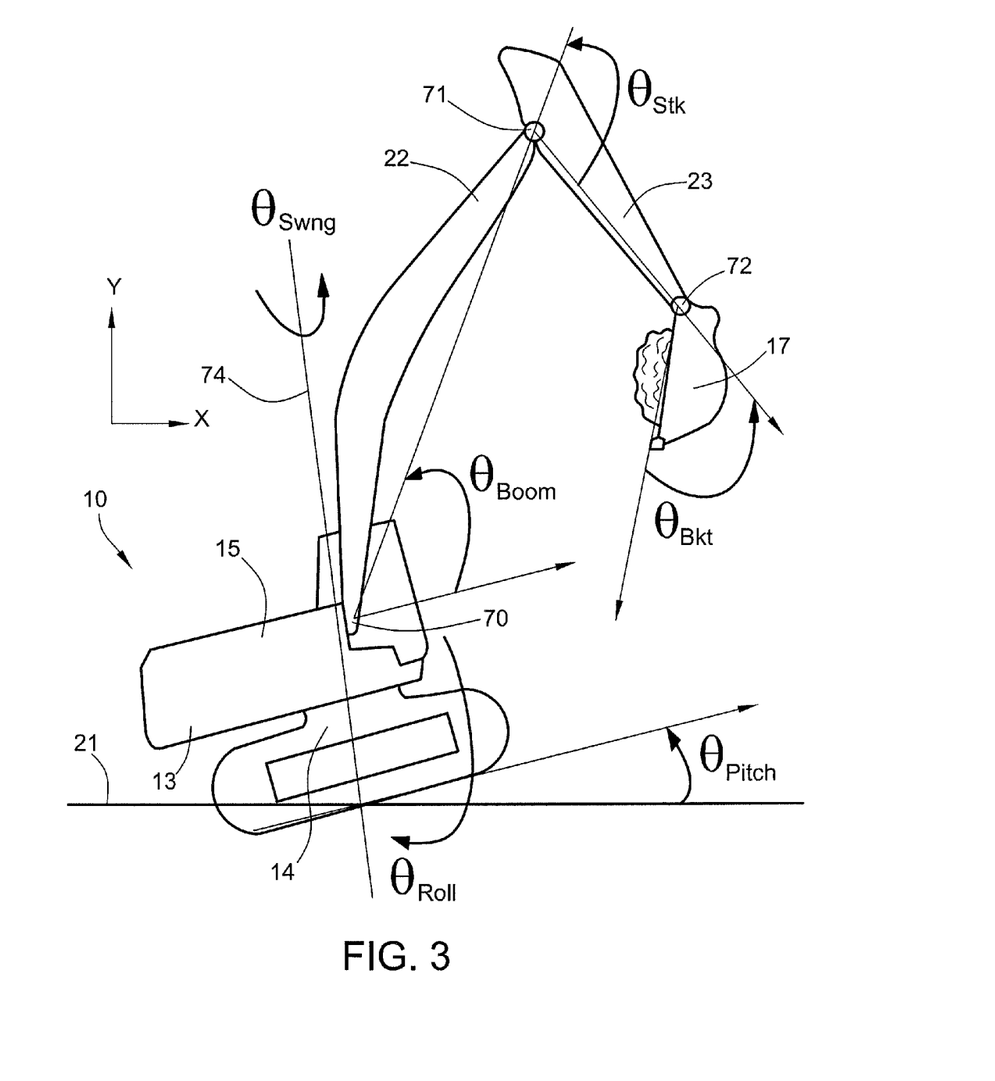
FIG. 3 is a somewhat schematic view of the excavator of FIG. 1.

Each of the boom hydraulic cylinders 26, stick hydraulic cylinder 27, and work implement hydraulic cylinder 28 may embody a linear actuator as depicted in FIG. 3 having a tubular or cylindrical body and a piston and rod assembly therein arranged to form two distinct pressure chambers. The pressure chambers may be selectively supplied with pressurized fluid and drained of the pressurized fluid to cause the piston and rod assembly to displace within the cylindrical body, and thereby change the effective length of the hydraulic cylinders. The flow rate of fluid into and out of the pressure chambers may relate to the speed of extension or retraction of hydraulic cylinders 26, 27, 28, while a pressure differential between the two pressure chambers may relate to the force imparted by the hydraulic cylinders to their associated linkage members. The extension and retraction of the hydraulic cylinders results in the movement of bucket 17. It is also contemplated that the actuators may alternatively embody electric motors, pneumatic motors, or any other actuation devices.

Swing motor 19 may also be driven by differential fluid pressure. Specifically, swing motor 19 may be a rotary actuator including first and second chambers (not shown) located on opposite sides of an impeller (not shown). Upon filling the first chamber with pressurized fluid and draining the second chamber of fluid, the impeller is urged to rotate in a first direction. Conversely, when the first chamber is drained of fluid and the second chamber is filled with pressurized fluid, the impeller is urged to rotate in an opposite direction. The flow rate of fluid into and out of the first and second chambers affects the rotational speed of swing motor 19, while a pressure differential across the impeller affects the output torque thereof Machine 10 may be equipped with a plurality of sensors that provide data, directly or indirectly, of the performance or conditions of various aspects of the machine. Angle sensors 30 (FIG. 2) may be located near one or more joints of the linkage members (i.e., the boom pivot 70 between platform 13 and boom member 22, the stick pivot 71 between boom member 22 and stick member 23, and the bucket pivot 72 between the work implement and stick member 23), and between platform 13 and undercarriage 14. Angle sensors 30 may include rotary encoders, potentiometers, or other angle or sensing devices for measuring the relative angular position of components. In an alternate embodiment, angle sensors 30 may measure the displacement of an actuator and the joint angles may be calculated based upon the position of the actuators and the dimensions of the linkage members. In another alternate embodiment, any or all of the angle sensors 30 may be configured to measure an angular velocity or an angular acceleration rather than angular position. Regardless of the type of angle sensor 30, output signals of the angle sensors may be used to determine the state of aspects of machine 10, including implement system 16, such as, for example, the position, the velocity, the acceleration, the angle, the angular velocity, and the angular acceleration of each linkage member, and the angle, the angular velocity, and the angular acceleration of the platform 13 relative to undercarriage 14.

Force sensors 31 may be configured to output a signal usable to determine a force created or experienced by the actuators and/or the linkage members. For example, a force sensor may embody a pressure sensor system including pressure sensors (not shown) located and configured to measure the pressure of the pressurized fluid within or supplied to one or both of the pressure chambers of the boom hydraulic cylinders 26. The measured pressures may be used to determine the force generated by each actuator. The forces together with the physical dimensions of the actuators and linkage members may be used to determine joint torques of the linkage members. Force sensors 31 may alternatively embody strain gauges, piezoelectric transducers, or other force sensing devices located at linkage joints, actuator joints, or any other appropriate location.

Attitude sensor 33 may measure the pitch and roll of machine 10. Attitude sensor 33 may be located at any appropriate location on machine 10, such as, for example, at operator station 18. Attitude sensor 33 may embody one or more gyroscopes, accelerometers, gravitational inclinometers, or any combination thereof A control system 35 may be provided to control the operation of the machine 10 including the payload calculation system of the machine. The control system 35, as shown generally in FIG. 2, may include an electronic control module such as controller 36. The controller 36 may receive operator input command signals and control the operation of the various systems of the machine 10. The control system 35 may include one or more operator input devices 34 such as a joystick to control the machine 10 and one or more sensors. The term "sensor" is meant to be used in its broadest sense to include one or more sensors and related components that may be associated with the machine 10 and that may cooperate to sense various functions, operations, and operating characteristics of the machine. The sensors of machine 10 may include a plurality of angle sensors 30, force sensors 31, and attitude sensors 33 (each of which is shown generally in FIG. 2) to provide data and other signals representative of various operating parameters of the machine 10. The controller 36 may communicate with the one or more sensors and the one or more operator input devices 34 via communication lines 38 or wirelessly.

The controller 36 may be an electronic controller that operates in a logical fashion to perform operations, execute control algorithms, store and retrieve data and other desired operations. The controller 36 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller such as power supply circuitry, signal conditioning circuitry, driver circuitry, and other types of circuitry.

The controller 36 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 36 may be implemented in hardware and/or software without regard to the functionality. The controller 36 may rely on one or more data maps relating to the operating conditions of the machine 10 that may be stored in the memory of controller. Each of these maps may include a collection of data in the form of tables, graphs, and/or equations. The controller 36 may use the data maps to maximize the performance and efficiency of the machine 10.

Figure 2:
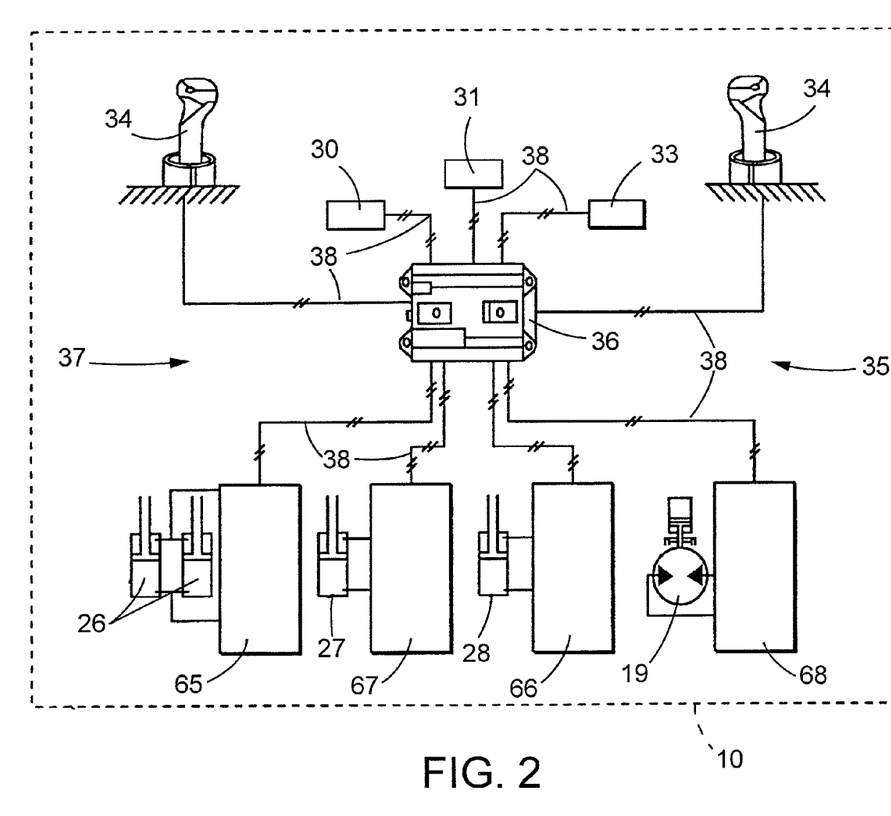
FIG. 2 is a simplified schematic view of a control system within the excavator of FIG. 1.

The boom hydraulic cylinders 26, the stick hydraulic cylinder 27, the work implement hydraulic cylinder 28, and the swing motor 19 may function together with other cooperating fluid components to move bucket 17 in response to input received from the operator input device 34. In particular, control system 35 may include one or more fluid circuits (not shown) configured to produce and distribute streams of pressurized fluid. A boom control valve 65, a stick control valve 66, a bucket control valve 67, and a swing control valve 68 may be situated to receive the streams of pressurized fluid and selectively meter the fluid to and from the boom hydraulic cylinders 26, the stick hydraulic cylinder 27, the work implement hydraulic cylinder 28, and the swing motor 19, respectively, to regulate the motions thereof Controller 36 may be configured to receive input from the operator input device 34 and to command operation of the boom control valve 65, the stick control valve 66, the bucket control valve 67, and the swing control valve 68 in response to the input and based on the data maps described above. Specifically, controller 36 may receive the input device position signal indicative of a desired speed and/or force of bucket 17 in a particular direction, and reference the selected and/or modified data maps stored in the memory of controller 36 to determine flow rate values and/or associated positions for each of the supply and drain elements within the boom control valve 65, the stick control valve 66, the bucket control valve 67, and the swing control valve 68. The flow rates or positions may then be commanded of the appropriate supply and drain elements to cause filling and/or draining of the chambers of the actuators at rates that result in the desired movement of bucket 17.

In operation, a typical work cycle for machine 10 may be divided into four relatively distinct segments. In a first or dig segment, an operator maneuvers the implement system 16 including bucket 17 at a dig site 24 to load the bucket. During such operation, the operator may use the bucket 17 to manipulate the material to optimize the digging operation. In a second or swing-to-truck segment, the implement system 16 is moved with a loaded bucket 17 from the dig site 24 so as to be aligned with a desired dump site. In one example, such a desired dump site may be haul vehicle 12 (FIG. 1). In a third or dump segment, the implement system 16 including bucket 17 are moved to empty or dump the bucket. In a fourth or swing-to-trench segment, the implement system 16 including bucket 17 is returned to the dig site 24 at which another digging operation or work cycle may begin.

In some situations, it is desirable to measure or calculate the amount of material moved by the machine during each work cycle. Control system 35 may include a payload control system 37 to calculate or estimate the payload moved within the bucket 17 during each work cycle. The payload control system 37 may utilize various operating conditions or the state of the machine 10 together with various operating parameters of the machine to calculate the payload. Such operating conditions may include the positions, velocities, accelerations, and orientations of the linkage members of the implement system 16 and the platform 13. The parameters may include the masses and inertias of the linkage members of the implement system 16 and the platform 13.

Referring to FIG. 3, it may be seen that movement of the bucket 17 may be achieved by movement of any of the components of the implement system 16 as well as movement of the platform 13 relative to the undercarriage 14 or movement of the machine 10 relative to work surface 21. Each linkage member may include at least one pivot joint to permit the linkage member to pivot relative to another linkage member or component of the machine 10. Boom member 22 has a boom pivot 70 about which the boom member 22 may pivot relative to the platform 13. Movement of the boom member 22 relative to the platform 13 may be measured about boom angle $\theta_{Boom}$. Stick member 23 has a stick pivot 71 about which the stick member 23 may pivot relative to the boom member 22. Movement of the stick member 23 relative to the boom member 22 may be measured about stick angle $\theta_{Stk}$. Bucket 17 has a bucket pivot 72 about which the bucket may pivot relative to the stick member 23. Movement of the bucket 17 relative to the stick member 23 may be measured about bucket angle $\theta_{Bkt}$. Platform 13 may rotate relative to undercarriage 14. Movement of the platform 13 relative to the undercarriage 14 may be measured about swing angle $\theta_{Swng}$. Pitch of the machine 10 is depicted as pitch angle $\theta_{Pitch}$. Roll of the machine 10 is depicted as roll angle $\theta_{Roll}$.

Angle sensors 30 may be provided to measure either directly or indirectly each of the boom angle $\theta_{Boom}$, the stick angle $\theta_{Stk}$, the bucket angle $\theta_{Bkt}$, and the swing angle $\theta_{Swng}$. Attitude sensor 33 may be used to measure pitch angle $\theta_{Pitch}$ and roll angle $\theta_{Roll}$. Each of the angle sensors 30 and the attitude sensor 33 may not directly measure the angle, the angular velocity, and the angular acceleration of each component of machine 10 but may, when combined with controller 36, provide such information directly or indirectly.

The payload control system 37 may utilize various operating conditions and parameters together with a dynamic model based upon a free-body diagram about a portion of the implement system 16 to estimate a load in the bucket 17. The dynamic model may result in a plurality of equations that may be a function of all of the positions and movement of all of the linkage members and the machine 10. The position and movement of the all of the links and the machine 10 may be referred to as the state of the machine.

In one example, a dynamic model may be based upon a free-body diagram about the boom joint or boom pivot 70 at which the boom member 22 is connected to and pivots relative to platform 13. The dynamic model may be expressed as an equation solved for the torque about the boom pivot 70. In doing so, the torque about the boom pivot 70 may be broken into two components and may be expressed as follows:

$$\tau_{Boom} = \tau_{No\ load} + \tau_{Payload} \quad (1)$$

where $\tau_{Boom}$ is the torque at boom pivot 70, $\tau_{No\ load}$ is the component of the torque at the boom pivot 70 when there is no load in the bucket 17, and $\tau_{Payload}$ is the torque at the boom pivot 70 due to the payload in the bucket 17. Equation (1) may also be expressed as:

$$\tau_{Boom} = W\phi + W_{PL}\phi_{PL} \quad (2)$$

where W is an array or matrix of machine state equations, $\phi$ is an array or matrix of machine calibration parameters, $W_{PL}$ is an array or matrix of machine state equations related to a payload in bucket 17, and $\phi_{PL}$ is an array or matrix of parameters related to the payload in bucket 17.

The torque at the boom pivot 70 ($\tau_{Boom}$) may be determined based upon the dimensions of the boom member 22 and the angles between the boom member and the boom hydraulic cylinder 26 to determine the perpendicular distance between the boom pivot 70 and the boom hydraulic cylinder connection 73 (FIG. 1) to the boom hydraulic cylinder 26. The controller 36 may use the force at the boom hydraulic cylinder connection 73 together with the perpendicular distance between the boom pivot 70 and the boom hydraulic cylinder connection 73 to determine the torque at the boom pivot.

Machine state matrix W is an array or matrix of equations each of which may be a function of any or all of the positions and movements that make up the state of machine.

In one example, machine parameter matrix $\phi$ is an array or matrix of terms related to the boom member 22, the stick member 23, and the bucket 17 and may be represented as follows:

$$\phi = \begin{bmatrix} I_{Boom} + M_{Boom}r_{Boom}^2 \\ I_{Stk} + M_{Stk}r_{Stk}^2 \\ I_{Bkt} + M_{Bkt}r_{Bkt}^2 \\ M_{Bkt} \\ M_{Stk} + M_{Bkt} \\ M_{Bkt}r_{Bkt}\sin(\alpha_{Bkt}) \\ M_{Bkt}r_{Bkt}\cos(\alpha_{Bkt}) \\ M_{Stk}r_{Stk}\sin(\alpha_{Stk}) \\ M_{Stk}r_{Stk}\cos(\alpha_{Stk}) \\ M_{Boom}r_{Boom}\sin(\alpha_{Boom}) \\ M_{Boom}r_{Boom}\cos(\alpha_{Boom}) \\ M_{Bkt}r_{Bkt}^2\sin(2\alpha_{Bkt}) \\ M_{Bkt}r_{Bkt}^2\cos(2\alpha_{Bkt}) \\ M_{Stk}r_{Stk}^2\sin(2\alpha_{Stk}) \\ M_{Stk}r_{Stk}^2\cos(2\alpha_{Stk}) \\ M_{Boom}r_{Boom}^2\sin(2\alpha_{Boom}) \\ M_{Boom}r_{Boom}^2\cos(2\alpha_{Boom}) \end{bmatrix} \quad (3)$$

where, for each term, M is the mass, I is the inertia, r is the distance from its center of gravity to its pivot, and $\alpha$ is the angle from its center of gravity relative to its pivot. The subscript "Boom" designates the boom member 22, "Stk" designates the stick member 23, and "Bkt" designates the bucket 17.

Payload state matrix $W_{PL}$ is an array or matrix of equations related to the payload in bucket 17 and in which each equation may be a function of any or all of the positions and movements that make up the state of machine.

In the example corresponding to machine parameter matrix $\phi$ above, payload parameter matrix $\phi_{PL}$ is an array or matrix of terms related to the payload and may be represented as follows:

$$\phi_{PL} = \begin{bmatrix} M_{PL} \\ I_{PL} + M_{PL}r_{PL}^2 \\ M_{PL}r_{PL}\sin(\alpha_{PL}) \\ M_{PL}r_{PL}\cos(\alpha_{PL}) \\ M_{PL}r_{PL}^2\sin(2\alpha_{PL}) \\ M_{PL}r_{PL}^2\cos(2\alpha_{PL}) \end{bmatrix} \quad (4)$$

where $M_{PL}$ is the mass of the payload, $I_{PL}$ is the inertia of the payload, $r_{PL}$ is the distance between the center of gravity of the payload and the bucket pivot 72, and $\alpha_{PL}$ is the angle from the center of gravity of the payload relative to the bucket pivot 72.

Equation (1) and equation (2) may be combined and expressed as:

$$\tau_{Boom} = \tau_{No\ load} + \tau_{Payload} = W\phi + W_{PL}\phi_{PL} \quad (5)$$

When no payload is in the bucket 17, equation (5) may be simplified to:

$$\tau_{Boom} = W\phi \quad (6)$$

and, solving for the machine parameter matrix $\phi$, may be re-written as:

$$\phi = W^{-1}\tau_{Boom} \quad (7)$$

Since both the torque at the boom pivot 70 ($\tau_{Boom}$) and the machine state matrix W may be determined from the sensors for each position of machine 10, controller 36 may solve equation (7) to determine the machine parameter matrix $\phi$. It should be noted that in doing so, it may not be necessary to solve for the specific parameters (M, I, r, $\alpha$) that make up the terms of $\phi$. Instead, a value may be determined for each line of the machine parameter matrix $\phi$ and such value represents a constant used with the dynamic model for the specific configuration of machine 10. In other words, the controller 36 may be able to solve equation (1) without knowing or determining at least some of the parameters that make up the machine parameter matrix $\phi$ such as the mass of the boom member 22, the mass of the stick member 23, and the mass of the bucket 17.

After the machine parameter matrix $\phi$ has been determined, equation (1) may be used to solve for the mass of any payload in the bucket. More specifically, equation (2) may be re-written as:

$$\phi_{PL} = W_{PL}^{-1}(\tau_{Boom} - W\phi) \quad (8)$$

Figure 4:
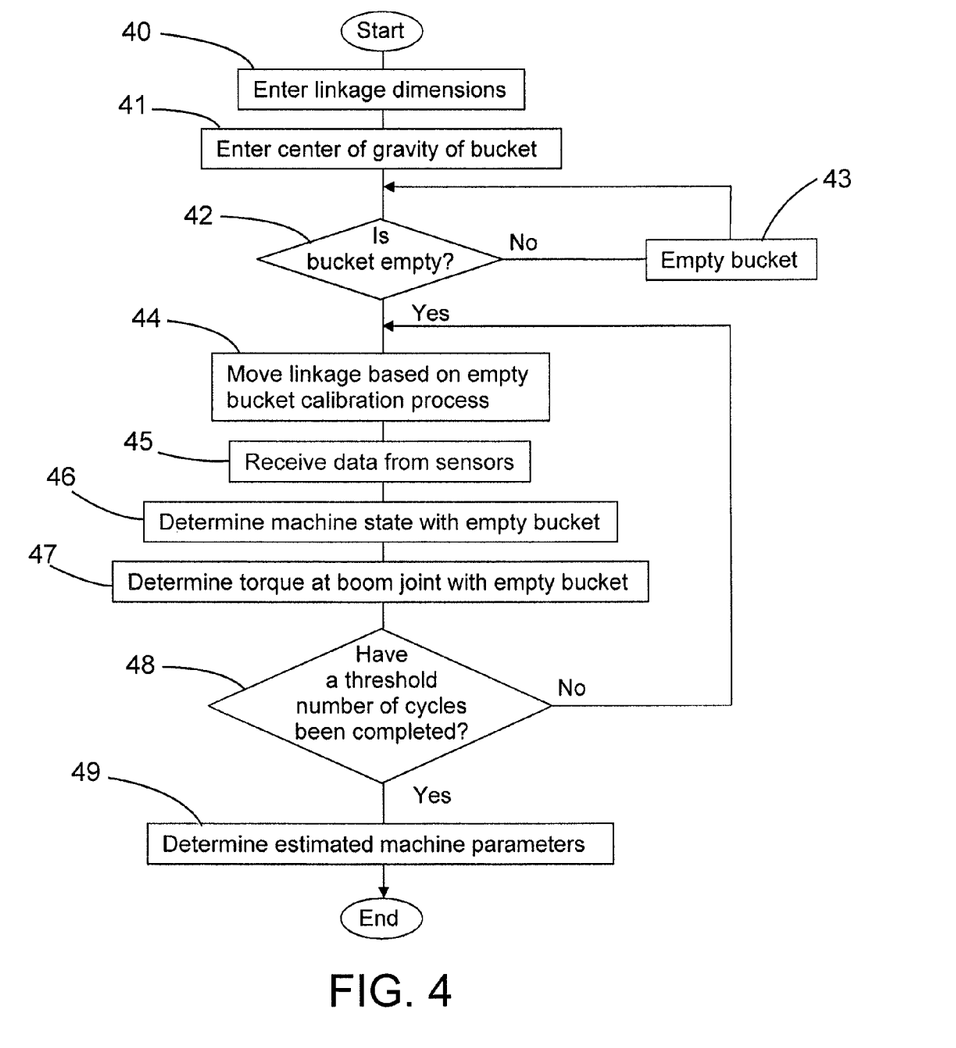
FIG. 4 is a flowchart illustrating a process for determining calibration parameters of a machine in accordance with the disclosure.

Referring to FIG. 4, a flowchart depicting a process for determining the machine calibration parameters of machine 10 is depicted. At stage 40, the dimensions of the implement system may be entered or stored in the controller 36. These dimensions may include the length of the boom member 22, the length of the stick member 23, and the distance between the axis 74 (FIG. 3) about which the platform 13 swings and the boom pivot 70. At stage 41, the center of gravity of the payload in bucket 17 may be entered into controller 36. In some instances, it may be desirable to utilize an estimate of the center of gravity. The center of gravity of the payload is used to determine the distance ($r_{PL}$) between the center of gravity of the payload and the bucket pivot 72 and the angle from the center of gravity of the payload relative to the bucket pivot 72 ($\alpha_{PL}$) as set forth in equation (4).

At decision stage 42, the controller 36 may display a message for the operator to confirm that the bucket 17 is empty. If the bucket 17 is not empty at decision stage 42, the operator may empty the bucket at stage 43.

Once the bucket 17 is empty, the operator may be instructed by the controller 36 at stage 44 to move the implement system 16 in a predetermined manner or a series of predetermined different manners to perform an empty bucket calibration process. More specifically, the controller 36 may be configured to instruct the operator to position the implement system 16 in a particular configuration (i.e., with the boom member 22, stick member 23 and the bucket 17 at predetermined angles relative to each other) and swing and/or move the implement system 16 in a predetermined manner and a predetermined number of times. For example, in one of empty bucket calibration cycle, the controller 36 may direct the operator to swing the implement system 16 and move the boom member 22 upward while positioning the stick member 23 at its uppermost position and with the bucket 17 at its innermost position.

In another empty bucket calibration cycle, the controller 36 may direct the operator to swing the implement system 16 and move the boom member 22 upward while positioning the stick member 23 at its uppermost position and moving the bucket 17 along its range of motion. In another empty bucket calibration cycle, the controller 36 may direct the operator to swing the implement system 16 and move the boom member 22 upward while retracting the stick member 23 and with the bucket 17 at its innermost position. In still another empty bucket calibration cycle, the controller 36 may direct the operator to swing the implement system 16 and move the boom member 22 upward while retracting the stick member 23 and with the bucket 17 at its outermost position. In some situations, it may be possible for the controller 36 to move the machine 10 as desired in an autonomous manner to perform the empty bucket calibration process.

The number and type of different empty bucket calibration cycles and the number of times each cycle is to be performed may be set based upon a desired accuracy of the payload calculation process. In one example, the implement system 16 may move through the four different empty bucket calibration cycles described above with each cycle being repeated five times.

While the work implement is moved in an unloaded condition during the empty bucket calibration process, the controller 36 may record various data indicative of various aspects of the state and operation of the machine. This data may be recorded or logged on a regular, predetermined basis such as every twenty milliseconds. Other time increments may also be used.

At stage 45, the controller 36 may receive data from various sensors of the sensor system that may be used to determine the state of the machine 10 and the implement system 16. More specifically, the controller 36 may receive data in the form of a first set of machine state signals from various angle sensors 30 associated with each of the joints of the linkage members as well as from the attitude sensor 33 that provides data indicative of the pitch and roll of machine 10. In other words, the sensor systems may provide to the controller 36 a plurality of machine state signals that are indicative of the state of the machine 10.

At stage 46, the controller 36 may utilize the first set of machine state signals to determine the state of the machine 10 with the work implement or bucket 16 empty. In other words, the controller 36 may utilize the first set of machine state signals to determine the calibration machine state based upon the first set of machine state signals. It should be noted that the first set of machine state signals provided by the sensor systems may not be directly indicative of all aspects of the machine state that are desired for the payload estimation process. As such, the controller 36 may utilize some of the first set of machine state signals from the sensors to determine other aspects of the machine state. For example, the angle sensors 30 may only provide signals indicative of the angular velocity of the various linkage members of the implement system 16. However, the controller 36 may utilize the angular velocity signals to determine the angles of the linkage members as well as their angular acceleration. In other embodiments, the angle sensors 30 may provide the angles of the linkage members and the controller 36 may use such angles to determine the angular velocity and angular acceleration of the linkage members. It is contemplated that the angle sensors 30 may be used in other manners to determine the state of the machine 10 as desired.

At stage 47, with the bucket 17 empty, the controller 36 may determine the torque at a joint of one of the linkage members. More specifically, the controller 36 may receive a calibration linkage force signal indicative of a force on a linkage member (such as at the boom hydraulic cylinder connection 73) from the force sensor 31 while the work implement or bucket 17 is moved in an unloaded condition. As an example, the controller 36 may receive signals indicative of the pressure at the boom hydraulic cylinders 26 including a head end cylinder pressure signal indicative of a head end cylinder and a rod end cylinder pressure signal indicative of a rod end cylinder. The controller 36 may utilize the head end cylinder pressure and the rod end cylinder pressure of each boom hydraulic cylinder 26 as well as the dimensions of the components of each boom hydraulic cylinder to determine the force exerted by the hydraulic fluid within each boom hydraulic cylinder 26. Inasmuch as the work implement or bucket 17 is empty, the force may sometimes be referred to as an empty implement or calibration linkage force.

The controller 36 may use the dimensions of the linkage member and the hydraulic cylinder or actuator and the angle between the linkage member and the hydraulic cylinder to determine the force perpendicular to a straight line between the pivot joint of the linkage member and the actuator connection or point at which the force is applied to the linkage member. The controller 36 may further use the calibration linkage force at the actuator connection together with the perpendicular distance between the linkage pivot joint and the actuator connection to determine the calibration torque at the linkage pivot joint. In the example in which the free-body diagram is about the boom pivot 70, the controller 36 may use the dimensions of the boom member 22 and the boom hydraulic cylinder 26 together with the angle between the boom pivot 70 and the boom hydraulic cylinder connection 73 to determine the calibration torque at the boom pivot 70.

At decision stage 48, the controller 36 may determine whether the implement system 16 has been moved through a threshold number of empty bucket calibration cycles. If a threshold number of empty bucket calibration data samples have been stored or logged within the controller 36, the controller may use equation (7) together with the calibration torque at the boom pivot 70 ($\tau_{Boom}$) and the calibration machine state (the machine state matrix W) generated during each of the plurality of empty bucket calibration cycles to determine and record at stage 49 an estimate of machine calibration parameters such as the machine parameter matrix φ of equation (7).

Figure 5:
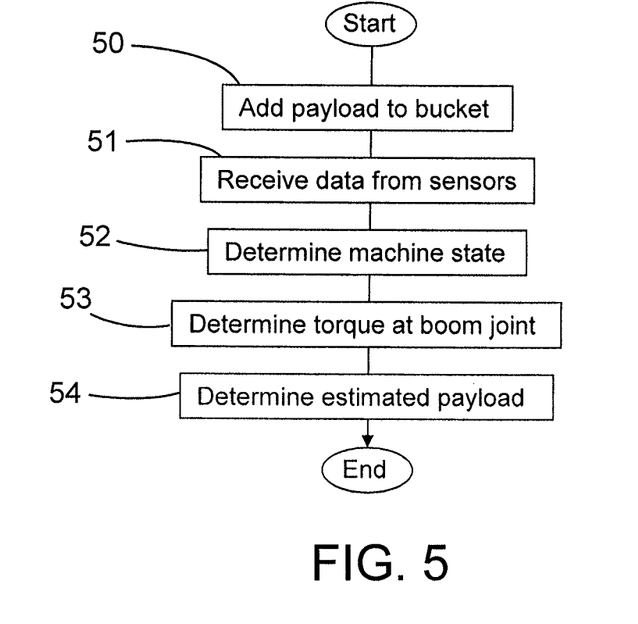
FIG. 5 is a flowchart illustrating a process for estimating a payload in accordance with the disclosure.

Once the machine calibration parameters or the machine parameter matrix φ have been determined, the payload control system 37 may operate in accordance with FIG. 5 to estimate a payload within the bucket 17. At stage 50, a load may be added to the bucket. An operator may move the machine 10 and implement system 16 as desired to move the load from the dig site 24 to the target such as haul vehicle 12. While doing so, the controller 36 may receive at stage 51 data in the form of a second set of machine state signals from various sensors of the sensor system as set forth above with respect to stage 45 indicative of the state of the machine 10. In other words, the sensor systems may provide to the controller 36 a plurality of machine state signals (or loaded implement machine state signals since the work implement is carrying a payload) that are indicative of the state of the machine 10. At stage 52, the controller 36 may utilize the loaded implement machine state signals to determine the loaded implement machine state as described above with respect to stage 46 but with the work implement or bucket 16 moving in a loaded condition.

At stage 53, the controller 36 may determine the torque at the same pivot joint of linkage member as described above with respect to stage 47. In doing so, the controller 36 may receive a loaded implement linkage force signal indicative of a force on a linkage member (such as the boom hydraulic cylinder connection 73) from the force sensor 31 while the loaded work implement or bucket 17 is moving such as from the dig site 24 to the target such as haul vehicle 12. In doing so, the controller 36 may receive the loaded implement linkage force signals and utilize them to determine the force exerted by the hydraulic fluid within the hydraulic cylinder (such as boom hydraulic cylinder 26). Inasmuch as the work implement or bucket 17 is carrying a payload, the force may sometimes be referred to as a loaded implement linkage force.

As described above, the controller 36 may use the dimensions of the linkage member and the hydraulic cylinder and the angle between the linkage member and the hydraulic cylinder to determine the force perpendicular to a straight line between the pivot joint of the linkage member and the actuator connection. The controller 36 may further use the loaded implement linkage force at the actuator connection together with the perpendicular distance between the linkage pivot joint and the actuator connection to determine the loaded implement torque at the linkage pivot joint. In the example in which the free-body diagram is about the boom pivot 70, the controller 36 may use the dimensions of the boom member 22 and the boom hydraulic cylinder 26 together with the angle between the boom pivot 70 and the boom hydraulic cylinder connection 73 to determine the loaded implement torque at the boom pivot 70.

At stage 54, the controller 36 may utilize equation (8) to determine the mass of the payload $M_{PL}$. More specifically, the loaded implement torque $\tau_{Boom}$ has been determined at stage 53 and the machine calibration parameters such as machine parameter matrix φ of equation (3) have been determined at stage 49. The machine state matrix W and the payload state matrix $W_{PL}$ may be determined by the controller 36 from signals provided by the angle sensors 30 and the attitude sensor 33. Accordingly, controller 36 may determine the payload parameter matrix $\phi_{PL}$ by solving equation (8). As with the machine parameter matrix φ, it may not be necessary for the controller 36 to determine each of the parameters (M, I, r, α) that make up the terms of the payload parameter matrix $\phi_{PL}$. It may be sufficient for the controller 36 to perform the minimum number of calculations to solve for the mass of the payload $M_{PL}$.

Once the machine calibration parameters have been determined such as based on the process set forth in FIG. 4, the machine 10 may operate as desired to move payloads from a dig site 24 to a target location. The payload control system 37 may measure the payload within the bucket 17 during each swing-to-dump process. In some applications, the calibration process set forth in FIG. 4 does not need to be repeated unless the operating conditions in which the machine 10 is operating significantly change (e.g., a change in temperature or other weather conditions) or some aspect of the machine changes (e.g., one or more teeth of the bucket 17 break or the entire bucket is changed for another bucket). In other applications, it may be desirable to conduct the calibration process of FIG. 4 each time the machine 10 begins operation or after a predetermined amount of time.

Industrial Applicability

The industrial applicability of the payload estimation system described herein will be readily appreciated from the foregoing discussion. The present disclosure is applicable to many machines and tasks performed by machines. One exemplary machine for which the payload estimation system is suited is an excavator. However, the payload estimation system may be applicable to other machines and material handling systems that benefit from the calculation or estimation of a payload.

The disclosed payload estimation system provides many advantages while operating material handling machines. Some existing payload estimation systems require an operator to move the payload in a particular manner during the measuring process. These movements may not be consistent with the operator's desired task of moving a load from a dig site 24 to a target such as a haul vehicle 12. The disclosed system operates to estimate the payload without constraining movements of the operator. In other words, the payload estimation system may operate while the work implement is moved along a three-dimensional path.

Although the example of the dynamic model depicted herein is based upon a free-body diagram about the boom pivot 70, the free-body diagram and the resulting equations may be based upon other locations of the machine 10 or implement system 16. In another embodiment, the free-body diagram may be based upon the stick pivot 71. In such case, the machine parameter matrix φ and the payload parameter matrix $\phi_{PL}$ may be different from those depicted above and the equations of the machine state matrix W and the payload state matrix $W_{PL}$ may be generated based upon the change in location of the free-body diagram.

In some instances, frictional forces may affect the accuracy of the payload estimation process. In some embodiments, the effects of friction may be part of the lumped parameter matrices. In other embodiments, the effects of friction may be separately calculated and subtracted from the force calculations described above.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for determining a mass of a payload moved by a work implement, comprising:
    a linkage member being movable along a path, the linkage member being operatively connected to move the work implement;
    a sensor system configured to provide a plurality of machine state signals indicative of a state of a machine;
    a force sensor system configured to provide a linkage force signal indicative of a force on the linkage member; and
    a controller configured to:
        receive a first set of unloaded machine state signals as the work implement is moved in an unloaded condition;
        determine a calibration machine state based upon the first set of unloaded machine state signals and without moving the work implement in a loaded state;
        determine a calibration linkage force on the linkage member based at least in part upon a calibration linkage force signal generated as the work implement is moved in the unloaded condition and without input based upon moving the work implement in a loaded state;
        determine machine calibration parameters based at least in part upon the calibration machine state and the calibration linkage force and without input based upon moving the work implement in a loaded state;
        receive a second set of loaded machine state signals as the work implement is moved in a loaded condition;
        determine a loaded implement machine state based upon the second set of loaded machine state signals;
        determine a loaded implement linkage force on the linkage member based at least in part upon a loaded implement linkage force signal generated as the work implement is moved in the loaded condition; and
        determine a mass of the payload based at least in part upon the machine calibration parameters, the loaded implement machine state, and the loaded implement linkage force.

2. The system of claim 1, wherein the controller is further configured to receive the unloaded implement machine state signals while the work implement is moved along a three-dimensional path.

3. The system of claim 1, wherein the controller is further configured to determine a calibration torque at a pivot joint of the linkage member based at least in part upon the calibration linkage force and without input based upon moving the work implement in a loaded state, and determine the machine calibration parameters based at least in part upon the calibration torque.

4. The system of claim 3, wherein the controller is further configured to determine a loaded implement torque at the pivot joint of the linkage member based at least in part upon the loaded implement linkage force, and determine the mass of the payload based at least in part upon the loaded implement torque.

5. The system of claim 1, wherein the system further includes an actuator operatively connected to the linkage member.

6. The system of claim 1, wherein the system further includes a swing member and an implement system comprising the linkage member, the implement system including a boom member, a stick member, and the work implement.

7. The system of claim 6, wherein the machine state signals include an angular position of at least one of the swing member, the boom member, the stick member, and the work implement.

8. The system of claim 6, wherein the machine state signals include an angular velocity of at least one of the swing member, the boom member, the stick member, and the work implement.

9. The system of claim 6, wherein the machine state signals include an angular acceleration of at least one of the swing member, the boom member, the stick member, and the work implement.

10. The system of claim 6, wherein the machine state signals include at least one of a pitch and a roll of the machine.

11. The system of claim 6, wherein the machine calibration parameters are based at least in part upon an inertia of one of the boom member, the stick member, and the work implement.

12. The system of claim 6, wherein the machine calibration parameters are based at least in part upon a mass of one of the boom member, the stick member, and the work implement.

13. The system of claim 6, wherein the machine calibration parameters are based at least in part upon a distance of a center of gravity of one of the boom member, the stick member, and the work implement from its pivot joint and an angle of the center of gravity relative to the pivot joint.

14. A controller implemented method of determining a mass of a payload moved by a work implement, comprising:
    receiving a first set of unloaded machine state signals as a work implement is moved in an unloaded condition;
    determining a calibration machine state based upon the first set of unloaded machine state signals and without moving the work implement in a loaded state;
    determining a calibration linkage force on a linkage member based at least in part upon a calibration linkage force signal generated as the work implement is moved in the unloaded condition and without input based upon moving the work implement in a loaded state;
    determining machine calibration parameters based at least in part upon the calibration machine state and the calibration linkage force and without input based upon moving the work implement in a loaded state;
    receiving a second set of loaded machine state signals as the work implement is moved in a loaded condition;
    determining a loaded implement machine state based upon the second set of loaded machine state signals;
    determining a loaded implement linkage force on the linkage member based at least in part upon a loaded implement linkage force signal generated as the work implement is moved in the loaded condition; and determining a mass of the payload based at least in part upon the machine calibration parameters, the loaded implement machine state, and the loaded implement linkage force.

15. The method of claim 14, further including moving the work implement along a three-dimensional path while receiving the first set of unloaded machine state signals.

16. The method of claim 14, further including determining a calibration torque at a pivot joint of the linkage member based at least in part upon the calibration linkage force and without input based upon moving the work implement in a loaded state, and determining the machine calibration parameters based at least in part upon the calibration torque.

17. The method of claim 16, further including determining a loaded implement torque at the pivot joint of the linkage member based at least in part upon the loaded implement linkage force, and determining the mass of the payload based at least in part upon the loaded implement torque.

18. The method of claim 14, further including providing a swing member and an implement system including a boom member, a stick member, and the work implement, and further including positioning the implement system in different manners while the work implement is moved in an unloaded condition along a three-dimensional path.

19. The method of claim 18, further including repeating movements of the work implement in an unloaded condition a predetermined number of times.

20. A machine comprising:
a work implement;
a linkage member being movable along a path, the linkage member being operatively connected to move the work implement;
a sensor system configured to provide a plurality of machine state signals indicative of a state of the machine;
a force sensor system configured to provide a linkage force signal indicative of a force on the linkage member; and
a controller configured to:
receive a first set of unloaded machine state signals as the work implement is moved in an unloaded condition;
determine a calibration machine state based upon the first set of machine state signals and without moving the work implement in a loaded state;
determine a calibration linkage force on the linkage member based at least in part upon a calibration linkage force signal generated as the work implement is moved in the unloaded condition and without input based upon moving the work implement in a loaded state;
determine machine calibration parameters based at least in part upon the calibration machine state and the calibration linkage force and without input based upon moving the work implement in a loaded state;
receive a second set of machine state signals as the work implement is moved in a loaded condition;
determine a loaded implement machine state based upon the second set of machine state signals;
determine a loaded implement linkage force on the linkage member based at least in part upon a loaded implement linkage force signal generated as the work implement is moved in the loaded condition; and
determine a mass of the payload based at least in part upon the machine calibration parameters, the loaded implement machine state, and the loaded implement linkage force.

21. A controller implemented method of determining machine calibration parameters of a machine, the machine having a swing member and an implement system including a boom member, a stick member, and a work implement, comprising:
rotating the swing member relative to a frame member while moving the boom member vertically with the work implement in an unloaded condition;
receiving a set of unloaded machine state signals as the swing member is rotated and the boom member is moved vertically with the work implement in the unloaded condition;
determining a calibration machine state based upon the set of unloaded machine state signals;
determining a calibration linkage force on a linkage member based upon a calibration linkage force signal generated as the work implement is moved in the unloaded condition; and
determining machine calibration parameters based upon the calibration machine state and the calibration linkage force.

22. The method of claim 21, further including moving the stick member relative to the boom member while rotating the swing member and moving the boom member.

* * * * *

UNITED STATES PATENT AND TRADEMARK OFFICE
CERTIFICATE OF CORRECTION

PATENT NO. : 8,909,437 B2  
APPLICATION NO. : 13/654028  
DATED : December 9, 2014  
INVENTOR(S) : Zhu et al.

Page 1 of 1

It is certified that error appears in the above-identified patent and that said Letters Patent is hereby corrected as shown below:

In the specification

Column 4, line 22, delete "thereof" and insert -- thereof. --.

Column 4, line 67, delete "thereof" and insert -- thereof. --.

Column 5, line 58, delete "thereof" and insert -- thereof. --.

Column 12, line 23, delete "Industrial Applicability" and insert -- INDUSTRIAL APPLICABILITY --.

Signed and Sealed this  
Tenth Day of November, 2015

Michelle K. Lee  
*Director of the United States Patent and Trademark Office*